(12) United States Patent
Schutt et al.

(10) Patent No.: US 7,548,155 B2
(45) Date of Patent: Jun. 16, 2009

(54) FIFTH WHEEL SENSOR ASSEMBLY

(75) Inventors: Randy L. Schutt, Holland, MI (US); Mark C. Pickhard, Lake Mills, WI (US)

(73) Assignee: SAF-Holland, Inc., Holland, MI (US)

( * ) Notice: Subject to any disclaimer, the term of this patent is extended or adjusted under 35 U.S.C. 154(b) by 265 days.

(21) Appl. No.: 11/350,542

(22) Filed: Feb. 9, 2006

(65) Prior Publication Data

US 2006/0186636 A1 Aug. 24, 2006

Related U.S. Application Data

(60) Provisional application No. 60/654,283, filed on Feb. 18, 2005.

(51) Int. Cl.
*G08B 21/00* (2006.01)
(52) U.S. Cl. ............ 340/431; 340/686.1; 340/687; 340/686.2; 340/686.5; 324/207.2; 280/29
(58) Field of Classification Search ............ 340/431, 340/686.1, 687, 686.2–686.5; 324/207.2; 280/29
See application file for complete search history.

(56) References Cited

U.S. PATENT DOCUMENTS

| | | | |
|---|---|---|---|
| 5,861,802 A | 1/1999 | Hungerink et al. | |
| 6,031,430 A * | 2/2000 | Heimlicher | 331/65 |
| 6,064,198 A * | 5/2000 | Wolf et al. | 324/207.2 |
| 6,285,278 B1 | 9/2001 | Schutt et al. | |
| 6,452,485 B1 | 9/2002 | Schutt et al. | |
| 6,798,217 B2 * | 9/2004 | Scheible | 324/654 |
| 2004/0075241 A1* | 4/2004 | Alguera et al. | 280/432 |
| 2005/0121921 A1* | 6/2005 | Alguera et al. | 292/201 |

* cited by examiner

*Primary Examiner*—Benjamin C. Lee
*Assistant Examiner*—Ojiako Nwugo
(74) *Attorney, Agent, or Firm*—Price, Henevald, Cooper, DeWitt & Litton, LLP

(57) ABSTRACT

An electronic system that monitors a trailer hitch assembly having a plate hitch with a throat for receiving a kingpin of a trailer and a locking mechanism for locking the kingpin within the throat. The electronic system determines whether the trailer hitch assemblies is properly coupled to the trailer, and comprises a first magnet creating a first magnetic flux, and a first Hall-effect sensor for sensing the position of the kingpin of the trailer relative to the throat of the hitch plate by measuring the first magnetic flux. The system further comprises a control circuit operably coupled with the first Hall-effect sensor in determining whether the first magnetic flux indicates a proper location of the kingpin of the trailer relative to the throat of the hitch plate. The electronic system discriminates between the kingpin and foreign materials, thereby assuring proper locking of the locking mechanism.

18 Claims, 8 Drawing Sheets

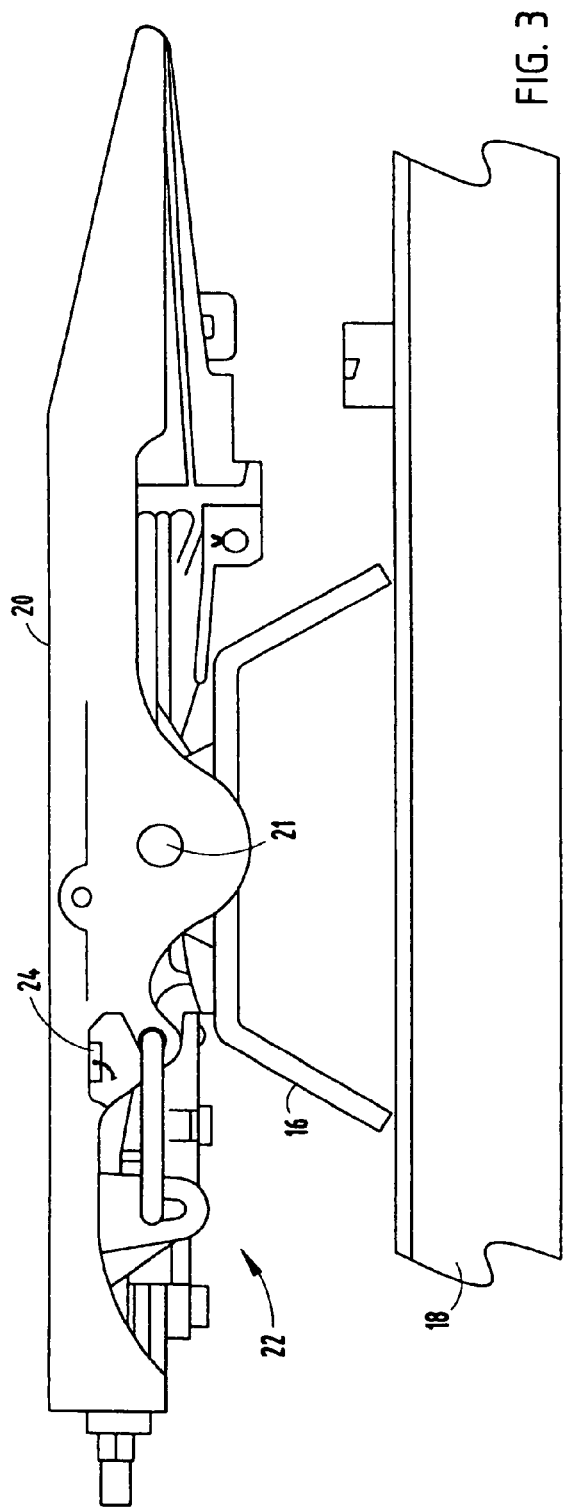
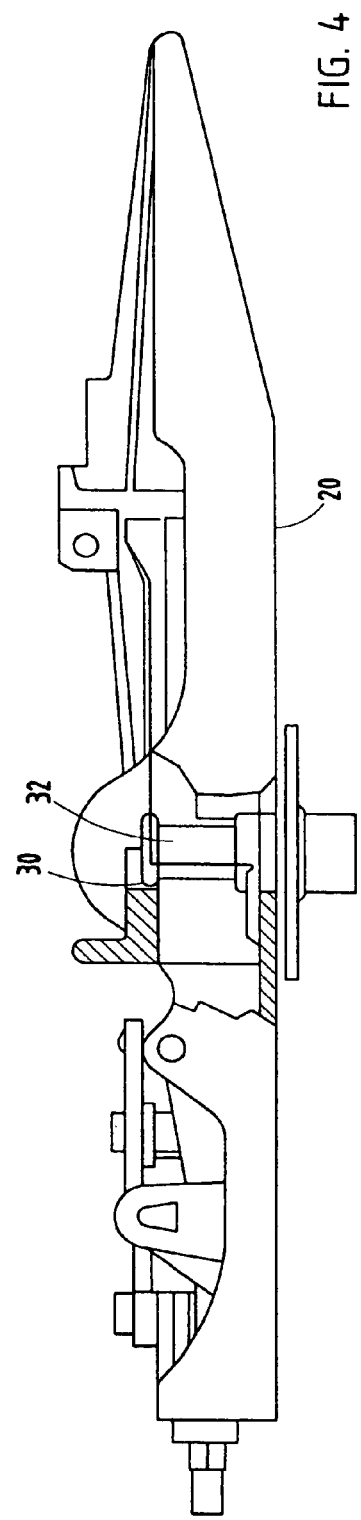

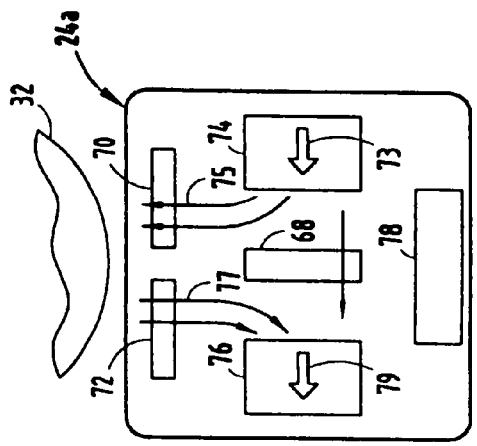
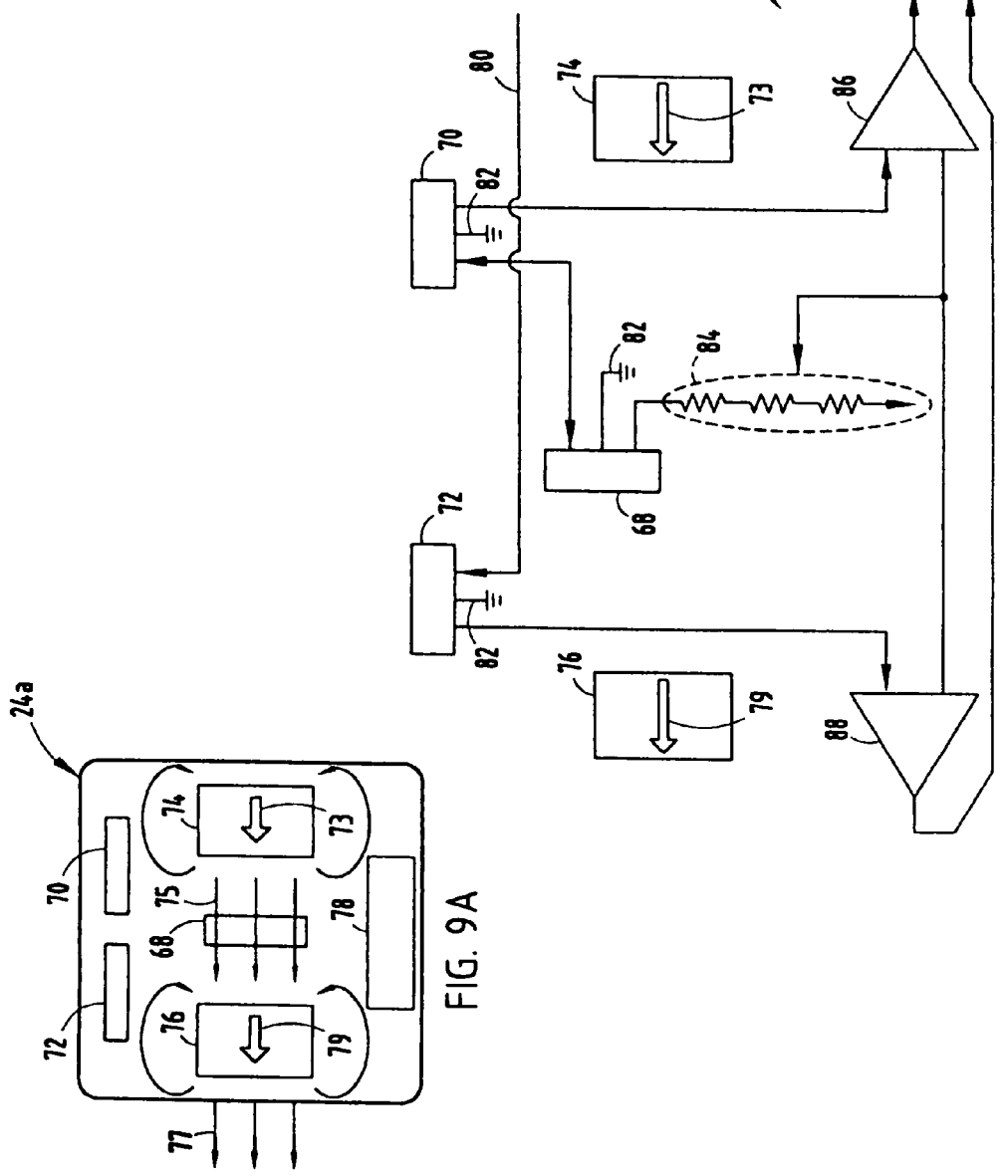
FIG. 9B
FIG. 9A
FIG. 10

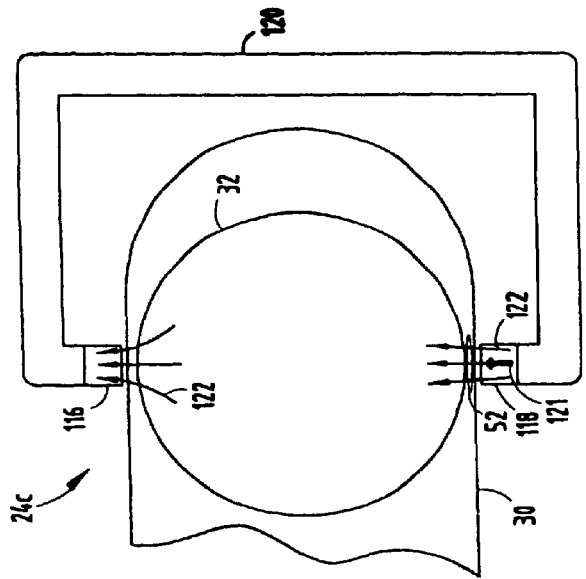
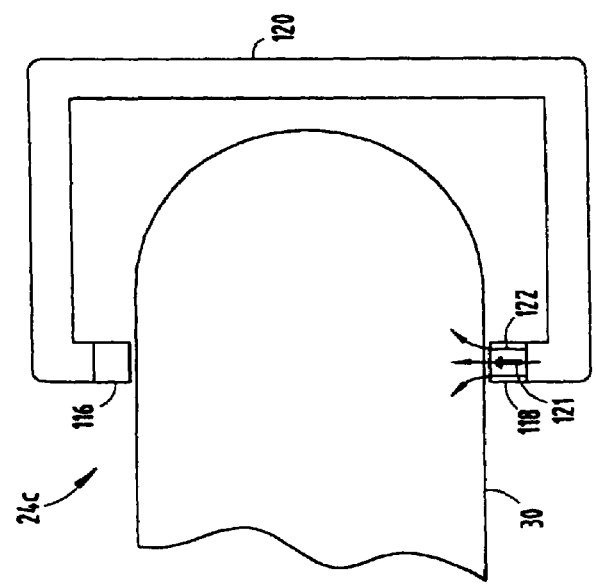
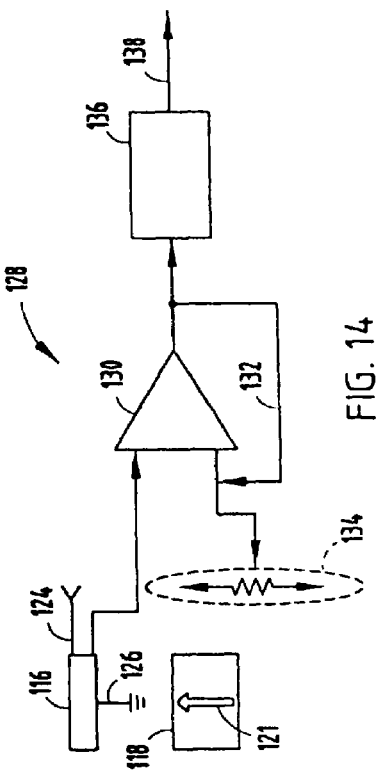

FIFTH WHEEL SENSOR ASSEMBLY

This application claims the benefit of U.S. Provisional Application No. 60/654,283, filed Feb. 18, 2005, entitled FIFTH WHEEL SENSOR ASSEMBLY, which is hereby incorporated herein by reference in its entirety.

BACKGROUND OF THE INVENTION

The present invention is directed to an electronic system for monitoring the coupling of a trailer to a trailer hitch assembly that is mounted on a truck chassis, and in particular is directed to an electronic system that indicates whether the trailer is properly coupled to the trailer hitch assembly by discriminating between components of the trailer, components of the hitch assembly and foreign materials.

Electronic coupling control systems for a vehicle trailer hitch assembly are described in each of U.S. Pat. No. 5,861,802, entitled "FIFTH WHEEL HITCH COUPLING CONTROL SYSTEM" to Hungerink et al. and U.S. Pat. Nos. 6,285,278 and 6,452,485, each entitled "ELECTRONIC SYSTEM FOR MONITORING A FIFTH WHEEL HITCH," to Schutt et al. U.S. Pat. Nos. 5,861,802; 6,285,278 and 6,452,485 are each assigned to the assignee of the present invention and are hereby incorporated by reference in their entirety. Each of these patents disclose an electronic coupling control system that includes a trailer sensor for sensing when a trailer is located proximate the hitch assembly, a kingpin sensor for sensing the presence of a trailer kingpin in a hitch plate throat, and a lock sensor for sensing when the locking mechanism is locked in a secured position. These patents further disclose an indicator located within the vehicle for providing trailer hitch assembly coupling status information to a driver of a vehicle. A control circuit is coupled to the trailer sensor, the kingpin sensor, the lock sensor and the indicator. The sensors are utilized by the control circuit to inform a driver when a trailer is in close proximity to the trailer hitch assembly, when the trailer kingpin is positioned in the hitch throat and when the locking mechanism is in a locked position. The electronic coupling control system is also capable of performing various self-diagnostic routines to ensure proper operation of the system when the vehicle ignition is turned on.

Heretofore, systems like those described above typically incorporate contact-type sensors susceptible to degradation from the stringent environment within which these sensors are utilized, including degradation from normal use, extreme use such as experienced during some coupling operations, and the inclusion of foreign solids within the environment, such as grease, water and ice each laden with ferromagnetic materials. These ferromagnetic materials as laden within the grease, etc., can be the cause of "false-positive" readings as conveyed to the operator, or readings that falsely indicate proper alignment of the kingpin with respect to the throat of the hitch plate. Improper alignment of the kingpin with the throat of the hitch plate may potentially result in dropping a trailer from the associated vehicle either at a shipping dock, or potentially on a public roadway, with significant damage to the associated equipment and surrounding property, and further personal injury or worse.

An electronic system for monitoring the receiving of a kingpin of a trailer within a throat of a hitch plate is desired that accurately and reliably differentiates between the kingpin and foreign materials, thereby eliminating "false-positive" readings of proper alignment to the operator of an associated vehicle.

SUMMARY OF THE INVENTION

One aspect of the present invention is to provide an electronic system for monitoring a trailer hitch assembly having a hitch plate and a throat for receiving a kingpin of a trailer and a locking mechanism for locking the kingpin within the throat, the electronic system determining whether the trailer hitch assembly is properly coupled to the trailer and comprising a first magnet creating a first magnetic flux, and a first Hall-effect sensor for sensing the position of the kingpin of the trailer relative to the throat of the hitch plate by measuring the first magnetic flux. The electronic system further comprises a control circuit operably coupled with the first Hall-effect sensor and determining whether the first magnetic flux indicates a proper location of the kingpin of the trailer relative to the throat of the hitch plate.

Another aspect of the present invention is to provide a hitching system that comprises a trailer hitch assembly having a hitch plate with a throat for receiving a kingpin of a trailer and a locking mechanism for locking the kingpin in the throat. The hitching system also includes a first magnet creating a first magnetic flux, and a first Hall-effect sensor for sensing the position of the kingpin of the trailer relative to the throat of the hitch plate by measuring the first magnetic flux. The hitching system further includes a control circuit operably coupled with the first Hall-effect sensor and determining whether the first magnetic flux indicates a proper location of the kingpin of the trailer relative to the throat of the hitch plate.

A further aspect of the present invention is to provide an electronic system for monitoring a trailer hitch assembly having a hitch plate with a throat for receiving a kingpin of a trailer and a locking mechanism for locking the kingpin in the throat, wherein the electronic system determines whether the trailer hitch assembly is properly coupled to the trailer. The electronic system comprises a non-contact proximity sensor for sensing the position of a kingpin of a trailer relative to a throat of a hitch plate, a control circuit operably coupled with the proximity sensor and determining whether a kingpin of the trailer is properly located relative to a throat of a hitch plate, and a display device operably coupled to the control circuit and displaying coupling status to an operator of a vehicle.

Yet another aspect of the present invention is to provide a hitching system that comprises a trailer hitch assembly having a hitch plate with a throat for receiving a kingpin of a trailer and a locking mechanism for locking the kingpin within the throat, and a non-contact proximity sensor for sensing the position of a kingpin of a trailer relative to the throat of the hitch plate. The hitching system further comprises a control circuit operably coupled with the proximity sensor and determining whether a kingpin of a trailer is properly located within the throat of the hitch plate, and a display device operably coupled to the control circuit and displaying coupling status to an operator of a vehicle.

The present inventive electronic system for monitoring the kingpin of a trailer within a throat of a hitch plate accurately and reliably differentiates between the kingpin and foreign materials, thereby eliminating "false-positive" readings of proper alignment to the operator of an associated vehicle, and increases the safety associated therewith. The system further reduces manufacturing costs, increases system reliability, is more durable, is capable of a long operating life and is particularly well adapted for the proposed use.

These and other features, advantages and objects of the present invention will be further understood and appreciated by those skilled in the art by reference to the following specification, claims, and appended drawings.

BRIEF DESCRIPTION OF THE DRAWINGS

FIG. 3 is a side view of the trailer hitch assembly;

FIG. 4 is a partial cross-section side view of a the trailer hitch assembly;

FIG. 9A is a schematic view of a second embodiment of the sensor assembly, wherein the second embodiment of the sensor assembly is at a zero-state;

FIG. 9B is a schematic view of the second embodiment of the sensor assembly, wherein the second embodiment of the sensor assembly indicates the location of the kingpin within the throat of the hitch plate;

FIG. 10 is an electrical schematic of the electrical circuit of the second embodiment of the sensor assembly;

FIG. 13A a schematic view of a fourth embodiment of the sensor assembly, wherein a Hall-effect type sensor and a biased magnet are positioned across a portion of the throat of the hitch plate from one another;

FIG. 13B is a schematic view of the fourth embodiment of the sensor assembly, wherein the a kingpin is positioned within the throat of the hitch plate;

FIG. 14 is an electrical schematic of the electrical circuit of the fourth embodiment of the sensor assembly;

DETAILED DESCRIPTION OF THE PREFERRED EMBODIMENTS

Figure 1:
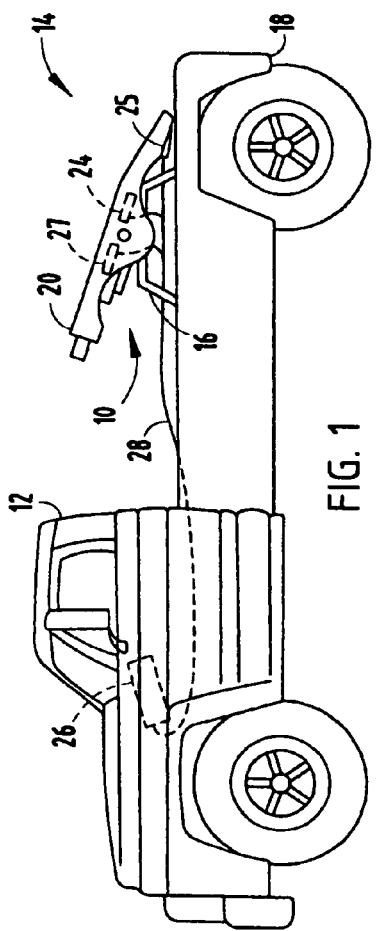
FIG. 1 is a side view of a truck/tractor including an electronic system embodying the present invention for monitoring a trailer hitch assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
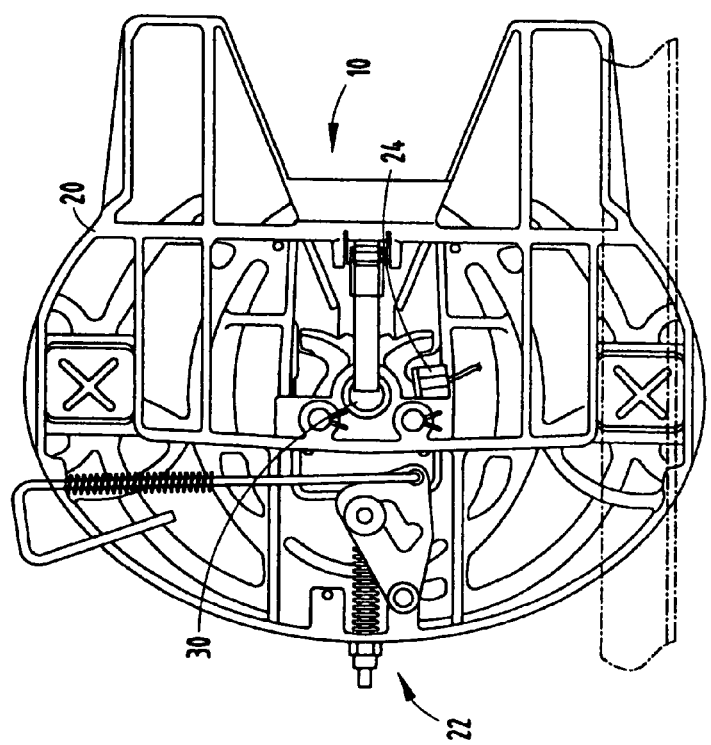
FIG. 2 is a bottom view of the trailer hitch assembly.

The reference numeral 10 (FIGS. 1-3) generally designates an electronic monitoring and sensing system incorporated within a truck/tractor 12 which includes a trailer hitch assembly having a base 16 securely mounted to a chassis 18, a trailer hitch plate 20 pivotally mounted on the base 16 on a transverse axis, and a locking mechanism 22 for locking a conventional trailer kingpin in place. The electronic system 10 preferably includes a non-contact kingpin sensor assembly 24 mounted to the hitch assembly 14, a tilt sensor assembly 25, a lock sensor 27, and an output device 26 mounted in the cab of the tractor 12. The tilt sensor assembly 25 and the lock sensor assembly 27 are described in U.S. Pat. Nos. 5,861,802; 6,285,278; and 6,452,485. The sensor assemblies 24, 25, 27 are coupled to the output device 26 by a multi-conductor cable 28. In a preferred embodiment, the non-contact kingpin proximity sensor 24 includes an inductive-type sensor, however, other proximity sensors may be utilized, including Hall-effect type sensors, and the like, as discussed below.

In the illustrated example, the sensor assembly 24 is mounted to the hitch plate 20 near the throat 30 formed in the hitch plate 20, into which a trailer kingpin 32 is positioned and locked. FIG. 4 provides an upside-down side view and partial cross section illustrating the location of the trailer kingpin 32 when properly disposed within the throat 30. As constructed, the sensor assembly 24 outputs a detection signal when the kingpin 32 is disposed within the throat 30. The calibration of the sensor assembly 24 prevents it from indicating that the kingpin 32 is present when a misaligned coupling occurs, which prevents the locking mechanism 22 from securing the kingpin 32 (i.e., the trailer) to the hitch plate assembly 14, or further from providing "false-positives" or untrue readings of a proper coupling, as discussed below. The locking mechanism 22 of the hitch plate assembly 14 is biased by a compression spring to automatically lock-in and secure the trailer kingpin 32 as soon as the trailer kingpin 32 enters the hitch throat 30. Those of ordinary skill in the art will appreciate that the present invention may be used in connection with any type of locking mechanism. It should further be noted that the present invention may be applied to tractor hitch assemblies having other constructions and is not limited to particular mounting locations as shown for the embodiments of the sensor assembly 24 described herein.

Figure 5:
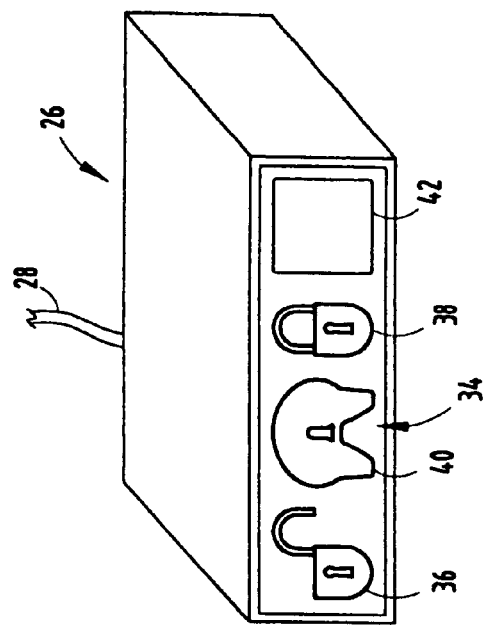
FIG. 5 is a perspective view of an output device.

FIG. 5 illustrates an exemplary output device 26. A multiple conductor cable 28 couples the sensor assembly 24 to the output device 26. The internal components (i.e., the control circuitry) of the output device 26 are further shown and described in U.S. Pat. No. 6,285,278, which is incorporated by reference herein in its entirety. The output device 26 includes a display panel 34 for providing coupling status information to the driver/operator of the tractor 12. In a preferred embodiment, the display panel 34 includes an "unlocked" icon 36, a "locked" icon 38, a "fifth wheel" icon 40 and seven-segment display 42. In the embodiment, the display 42 provides an error code indicating possible sources of a coupling malfunction, again as further described in U.S. Pat. No. 6,285,278. Preferably, a red light diode (LED) is provided behind the "unlocked" icon 36. Further, a yellow, a red, and green LED are provided behind the "fifth wheel" icon 40 and a green LED is provided behind the "lock" icon 38. One of ordinary skill in the art will appreciate that the individual LEDs could be replaced by an LED array capable of providing multiple colors. While output device 26 as shown only indicates visual indicators, one of ordinary skill in the art will readily appreciate that and audio output may be provided. For example, by adding a speaker and appropriate voice processing circuitry, the output device 26 may provide voice output to instruct a driver as to possible causes of a coupling malfunction. Additionally, a warning buzzer may be activated in addition to, or as an alternative, providing an unlocked icon 36.

Figure 6A:
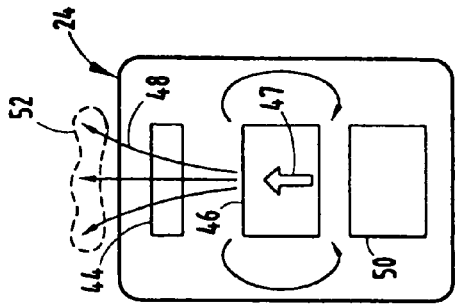
FIG. 6A is a schematic view of a first embodiment of the sensor assembly, wherein the sensor assembly is at a zero-state.
Figure 6B:
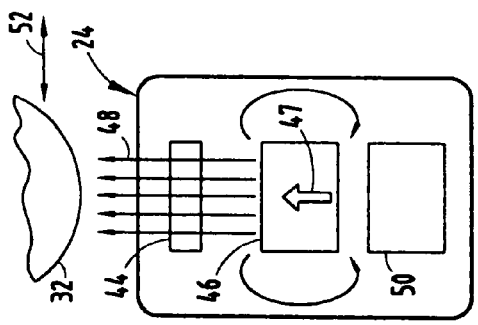
FIG. 6B is a schematic view of the first embodiment of the sensor assembly, wherein the sensor assembly indicates the location of a kingpin within the throat of an associated hitch plate.
Figure 6C:
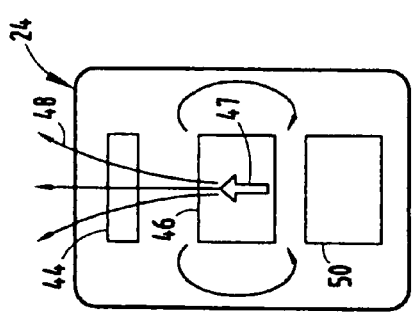
FIG. 6C is a schematic view of the first embodiment of the sensor assembly, wherein a ferromagnetic material is positioned within the throat of the hitch plate.

In a first embodiment, the sensor assembly 24 (FIG. 6A) includes an analog Hall-type sensor 44 with an integrated circuit, a biasing magnet 46 having a magnetic axis 47 and producing a magnetic flux 48, and a threshold adjustment and a switching circuit 50. The Hall-effect sensor 44 is sensitive to magnetic flux in a direction perpendicular to the larger dimension thereof. As best illustrated in FIG. 6A, the biasing magnet 46 provides a base or zero level flux 48 when the kingpin 32 is not properly located within the throat 30. The strength of the bias magnet 46 and the dynamic range of the Hall device within the sensor 44 determine the effective range of the sensor 44. As illustrated in FIG. 6B, with the kingpin 32 moved in a direction as illustrated and represented by directional arrow 52 and positioned proximate the sensor assembly 24, the flux 48 of the magnet 46 as read by the Hall sensor 44 is greater in strength due to the proximity of the ferromagnetic material comprising the kingpin 32. A positive signal is then generated indicating proper location of the kingpin 32 within the throat 30 of the hitch plate 20. As illustrated in FIG. 6C, a foreign material, such as grease, water, ice, and the like containing shavings or particles of a ferromagnetic material, commonly referred to as swarf, does not provide an adequate amount of flux 48, per proper calibration of the adjustment and switching circuit 50, in order to indicate a positive and proper location of the kingpin 32 within the throat 30.

Figure 8:
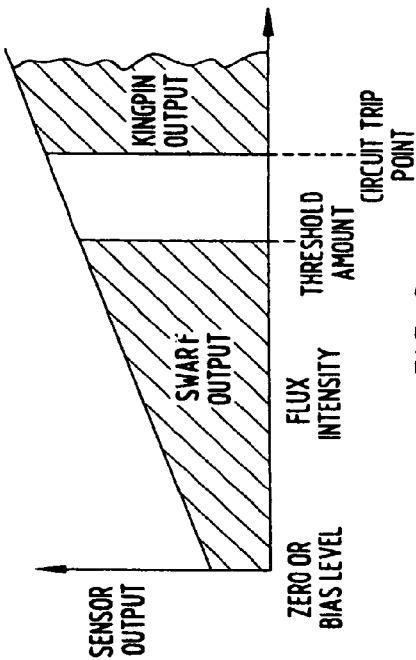
FIG. 8 is a theoretical plot of sensor output versus flux intensity.
Figure 7:
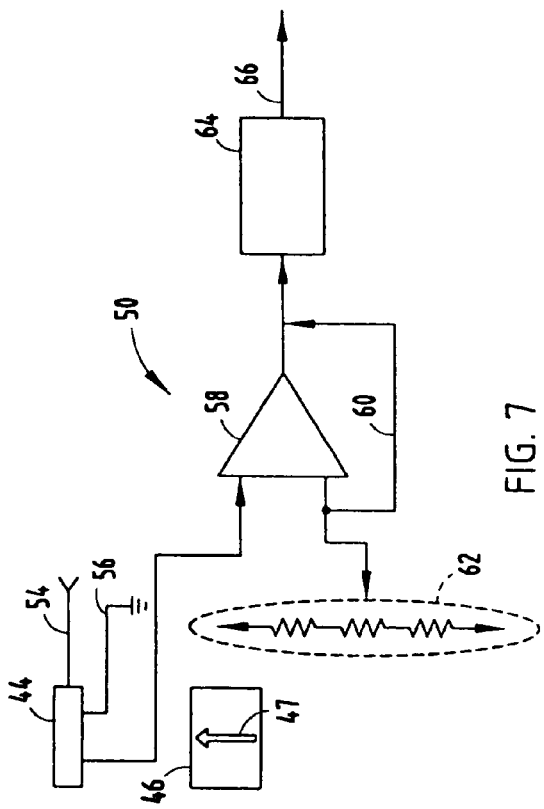
FIG. 7 is an electrical schematic of the first embodiment of the sensor assembly.

A schematic view of the sensor assembly 24 is illustrated in FIG. 7 and includes a power supply 54 and a ground 56 each coupled to the Hall sensor 44, and the switching circuit 50. The switching circuit 50 includes a comparator circuit 58, a hysteresis feedback loop 60, an analog or digital potentiometer 62 for adjusting the threshold sensitivity of the sensor assembly 24, and a signal conditioner 64 for conditioning the output signal 66 for the desired switching. A theoretical plot of the sensor output for optimizing the switching is illustrated in FIG. 8, wherein output is plotted versus the flux intensity.

The reference numeral 24a (FIG. 9A) generally designates another embodiment of the present invention, having a first Hall effect sensor 68, a second Hall sensor 70, a third Hall sensor 72, a first bias magnet 74 having a magnetic axis 73 and creating a first magnetic flux 75, a second bias magnet 76 having a magnetic axis 79 and creating a second magnetic flux 77, and a switching circuit 78. Each Hall sensor 68, 70, 72 is sensitive to the magnetic flux in a direction perpendicular to the larger dimension thereof. In the illustrated example, the first Hall sensor 68 is sensitive to the flux flowing between the magnets 74, 76 and along the magnetic axis 73, 79 thereof, while the second Hall sensor 70 and the third Hall sensor 72 are sensitive to magnetic fields that are perpendicular to the magnetic axis 73, 79 of the magnets 74, 76. As illustrated in FIG. 9B, the flux 75, 77 created by the magnets 74, 76 is drawn off through the second Hall sensor 70 and third Hall sensor 72 by a proper positioning of kingpin 32 within the throat 30.

A schematic of the sensor assembly 24a is shown in FIG. 10, wherein the sensor assembly 24a includes a power supply 80 operably coupled to each of the Hall sensors 68, 70, 72, and ground lines 82 for the same, and the switching circuit 78. In the illustrated example, the switching circuit 78 includes a threshold adjustment circuit 84, a first to second Hall sensor comparator 86, a first to third Hall sensor comparator 88, a window and comparator 90 to compare the differences between the outputs of the comparators 86, 88, and an output signal conditioner 92 providing an output signal 94.

Figure 11A:
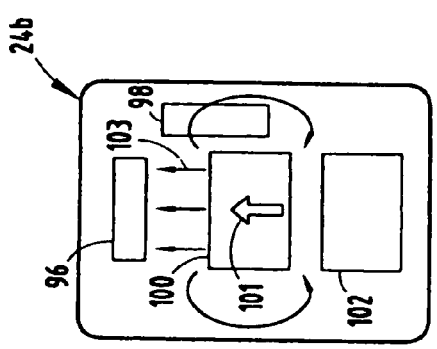
FIG. 11A is a schematic view of a third embodiment of the sensor assembly, wherein the third embodiment of the sensor assembly is at a zero-state.
Figure 11B:
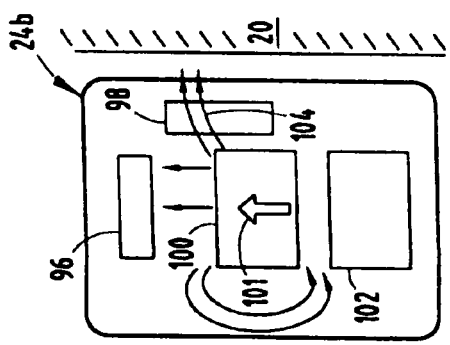
FIG. 11B is a schematic view of the third embodiment of the sensor assembly, wherein the sensor assembly indicates the location of a component different than the kingpin in close proximity to the sensor assembly.
Figure 11C:
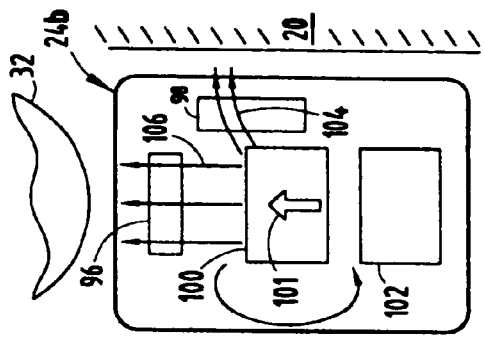
FIG. 11C is a schematic view of the third embodiment of the sensor assembly, wherein the sensor assembly indicates the location of a kingpin within the throat of the hitch plate.

The reference numeral 24b (FIG. 11A) represents another embodiment of the sensor assembly. In the illustrated example, the sensor assembly 24b includes a first Hall sensor 96, a second Hall sensor 98 oriented perpendicularly to the first Hall sensor 96, a bias magnet 100 having a magnetic axis 101 and creating a magnetic flux 103, and a thresholding and switching circuit 102. As illustrated, the Hall sensors 96, 98 are oriented such that the first Hall sensor 96 is sensitive to flux along the magnetic axis 101, while the second Hall sensor 98 is sensitive to flux perpendicular to the magnet axis 101, thereby making the sensor assembly 24b more sensitive to monitoring objects located along the magnetic axis 101 of the magnet, as well as perpendicular thereto. For example, as illustrated in FIG. 11B, the sensor assembly 24b may be calibrated to take into account magnetic flux as caused by components of the hitch assembly 14, such as hitch plate 20. In this arrangement, the second Hall sensor 98 is sensitive to flux 104 flowing in a perpendicular direction to the magnetic axis 101, which is used to precisely adjust the sensitivity of the overall sensor assembly 24b. As illustrated in FIG. 11C, proper placement of the kingpin 32 within the throat 30 causes an increase in the flux 106 flowing through the first Hall sensor 96, which is compared to the steady state reading developed from the orientation as illustrated in FIG. 11B.

Figure 12:
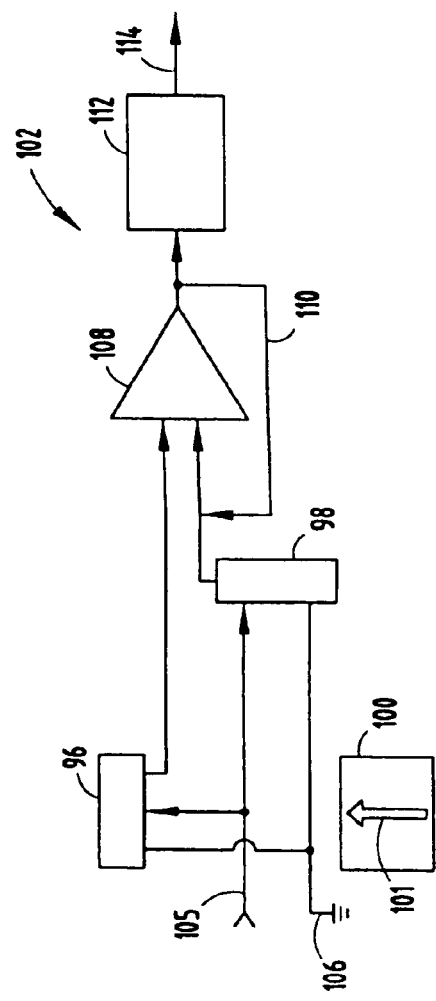
FIG. 12 is an electrical schematic of the electrical circuit of the third embodiment of the sensor assembly.

FIG. 12 illustrates the circuitry of the sensor assembly 24b and includes a power supply 105 and a ground 106 to each of the first Hall sensor 96 and the second Hall sensor 98, and the switching circuit 102. The switching circuit 102 includes a comparator 108 for comparing the outputs of the first Hall sensor 96 and the second Hall sensor 98, a feedback loop 110, and an output signal conditioner 112 producing an output signal 114.

The reference numeral 24c (FIG. 13A) represents yet another alternative embodiment of the sensor assembly that includes a Hall switch 116 and a bias magnet 118 having a magnetic axis 121 and creating a magnetic flux 122. In the illustrated example, the Hall switch 116 is mounted on one side of a horseshoe-shaped member 120 preferably constructed of a soft iron or other highly permeable material, thereby attracting magnetic flux on account of low magnetic resistance thereof. The magnet 118 is mounted to an opposite side of the member 120 and is positioned so as to direct the flux 122 created thereby in the direction of the Hall switch 116. Due to the spacing across the ends of the member 120, a relative small amount of the flux 122 is encountered by the Hall switch 116 when the kingpin 32 is not present within the throat 30. As illustrated in FIG. 13B, the flux 122 is increased with the presence of the kingpin 32 within the throat 30. It should be noted that in the illustrated example of the sensor assembly 24C the build up or addition of swarf material 52 within the throat 30 and about the kingpin 32 actually assists in the trip of the Hall switch 116 by filling any air gaps located between the kingpin 32 and the side edges of the throat 30. It should further be noted that the arrangement of the sensor assembly 24c has the advantage of not requiring an analog output to properly function.

FIG. 14 is a schematic view of the sensor assembly 24c that includes the Hall switch 116 having a power supply 124 and a ground 126, and a switching circuit 128. The switching circuit 128 includes a comparator 130, a feedback loop 132, a threshold adjustment circuit 134 and an output signal conditioner 136 providing an output signal 138.

Figure 15A:
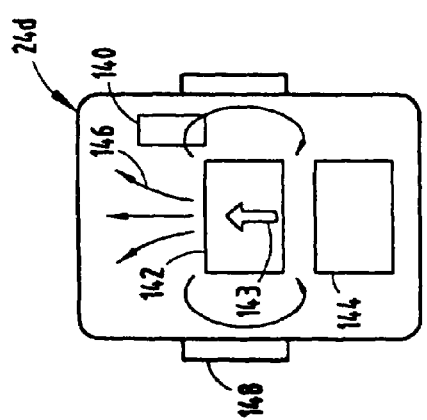
FIG. 15A is a schematic view of a fifth embodiment of the sensor assembly, wherein the sensor assembly is at a zero-state.
Figure 15B:
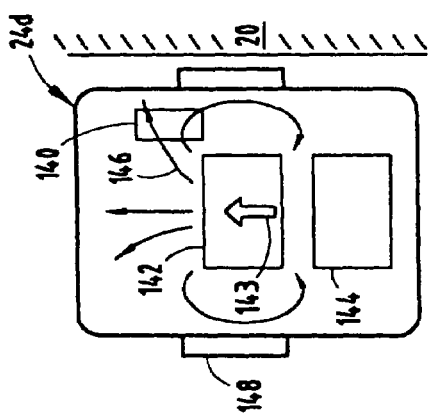
FIG. 15B is a schematic view of the fifth embodiment of the sensor assembly, wherein the sensor assembly indicates the location of a component different than the kingpin.
Figure 15C:
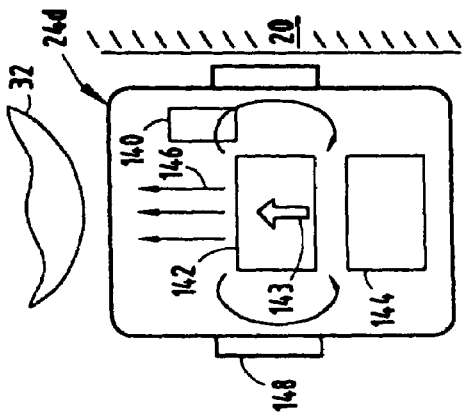
FIG. 15C is a schematic view of the fifth embodiment of the sensor assembly, wherein the sensor assembly indicates the location of the kingpin within the throat of the hitch plate.

The reference numeral 24d (FIG. 15A) represents another embodiment of the sensor assembly. The sensor assembly 24d includes a first Hall-effect sensor 140, a bias magnet 142 having a magnetic axis 143 creating a flux 146, and a switching circuit 144. In the illustrated example, the first Hall sensor 140 is oriented perpendicularly to and is offset from the axis of the magnet 142. As best illustrated in FIG. 15A, the flux 146 flows generally along the axis of the magnet 142. As illustrated in FIG. 15B, the flux 146 is pulled perpendicularly to the axis of the magnet 142 towards a component of the trailer hitch assembly 14, such as the hitch plate 20, thereby allowing for adjustment and fine tuning of the overall sensor assembly 24d and allowing the adjustments thereof to take into account the presence of components other than the kingpin 32. The sensor assembly 24d further includes a pair of shields each containing an amount of ferromagnetic material that aids in directing the flux 146 about the sides of the sensor 24d, thereby creating or acting as a shield to any other external medal components or swarf in the monitored area. As best illustrated in FIG. 13C, a larger amount of the flux 146 is directed along the axis of the magnet 142 and toward the kingpin 32 away from the Hall sensor 140 when the kingpin 32 is properly located within the throat 30. As illustrated, the sensor assembly 24d allows the setting of a trip point to incorporate a threshold to ignore detrimental amounts of swarf causing a "false-positive" reading of the sensor assembly 24d.

Figure 16:
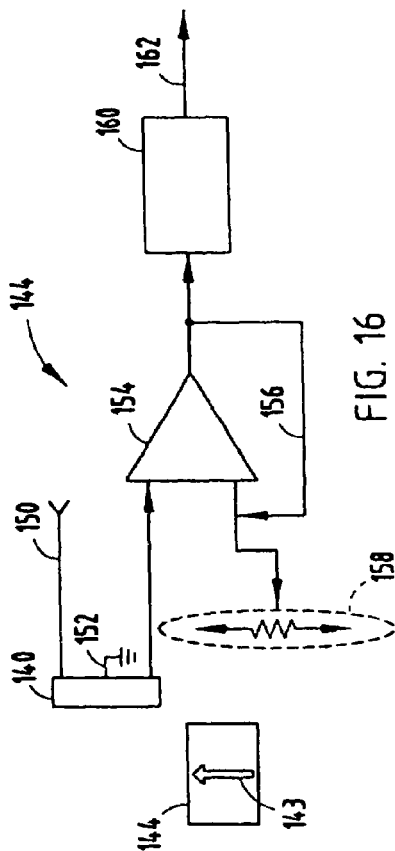
FIG. 16 is an electrical schematic of the electrical circuit of the fifth embodiment of the sensor assembly.

FIG. 16 is a schematic view of the sensor assembly 24d including a power supply 150 and a ground 152 to the Hall sensor 140, and the switching circuit 144. The switching circuit 144 includes a comparator 154, a feedback loop 156, a threshold circuit 158 and an output signal conditioner 160 providing an output signal 162.

The electronic monitoring system 10 preferably includes an induction proximity sensor 164 (FIG. 17) in place of the Hall-effect sensor arrangements as disclosed herein. As is known in the art, inductive proximity sensors function by sensing a change to the properties of a related inductor. The properties of the inductor will change if a ferrous or conductive material is placed within a space-sensing region within the inductors magnetic field that may extend outwardly of the inductor. Typically, inductor sensors utilize an oscillating (AC) signal within the inductor to sense inductor property changes, with the frequency of the oscillations changing the importance of the various properties of the inductor. As illustrated, the inductor sensor of the induction proximity sensor 164 senses the amount of loss on the inductor when a ferromagnetic material is in close proximity thereto. In the present example, the operating frequency of the inductive proximity sensor is preferably less than 50 kHz, 20 kHz nominal, thereby reducing false-positives as caused by ferromagnetic material laden swarf. A specific advantage of the induction proximity sensor 164 is the elimination of a bias magnet as required with Hall-effect and reed switch sensors.

Figure 17:
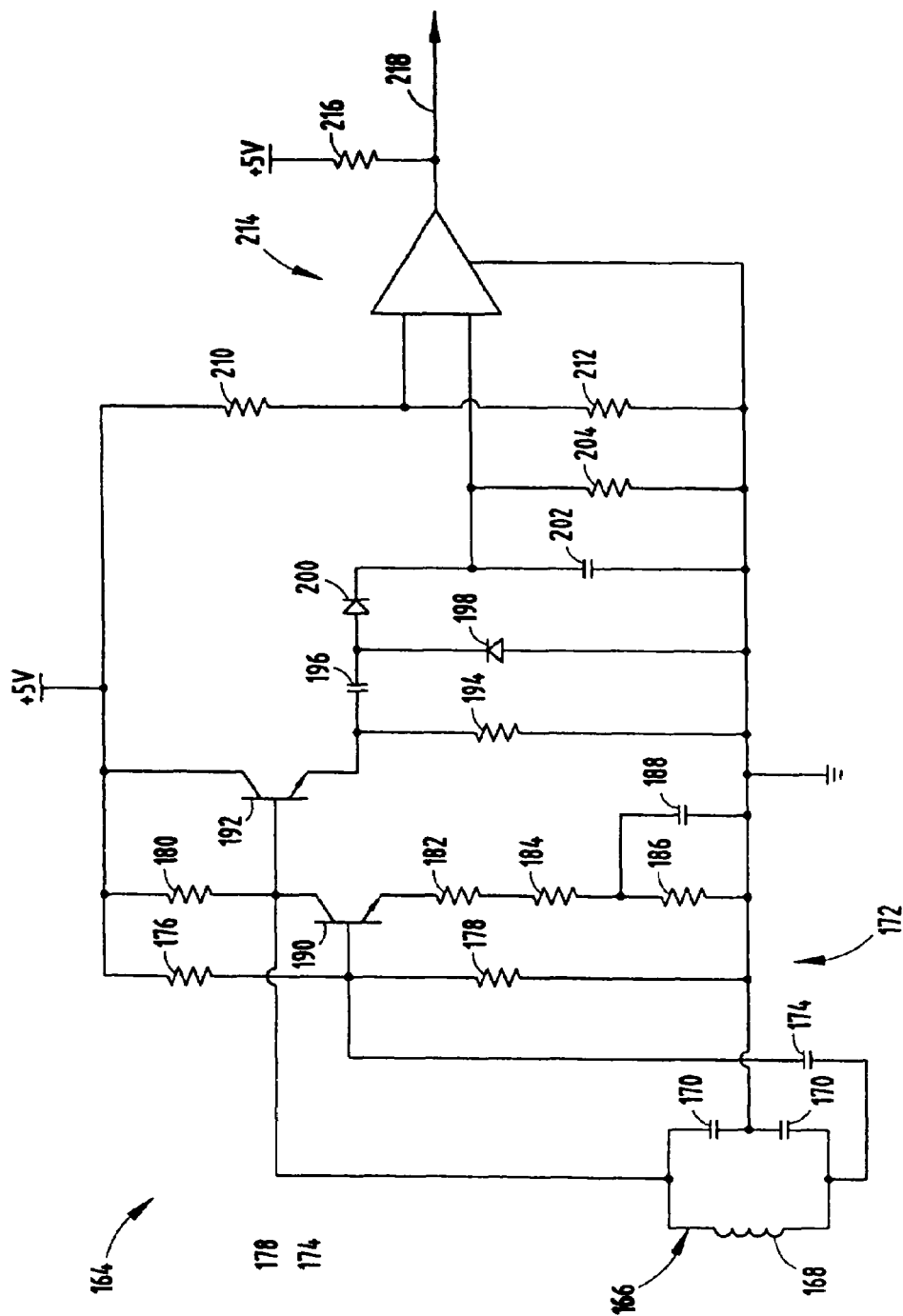
FIG. 17 is a schematic view of an electrical circuit of a sixth embodiment of the sensor assembly that includes an inductive proximity sensor.

FIG. 17 is a schematic view of the inductive proximity sensor 164 that comprises a tank circuit 166 including a sense coil 168 and a series combination of a pair of capacitors 170. The oscillation frequency of the tank circuit 166 is preferably less than or equal to 50 kHz (20 kHz nominal). The tank circuit 166 forms part of a Colpitts oscillator circuit 172 that includes a capacitor 174, resistors, 176, 178, 180, 182, 184, 186, a capacitor 188, and a transistor 190. The transistor 190 provides feedback energy needed to maintain the oscillation of the tank circuit 166. The resistors 176, 178, 180 and the series combination of the resistors 182, 184, 186 set the DC operating point of the transistor 190. The capacitor 188 is utilized to AC-bypass the resistor 186 to increase the AC gain of the transistor 190 independent of the DC bias. The components of the oscillator circuit minimize the amount of feedback required to maintain the oscillation. In the present example, losses induced by a conductive object proximate the sense coil 168 causes the oscillator to decrease in amplitude. Preferably, the resistor 184 is utilized to compensate for temperature-dependent circuit losses, and mainly the resistance of the copper winding utilized within the sense coil 168. A transistor 192 and a resistor 194 provide a buffered output of the Colpitts oscillator 172. A capacitor 196 blocks the DC level present at the emitter of the transistor 192. A first diode 198 provides a new ground-based DC level, and a second diode 200 half-wave rectifies the AC output of the oscillator. A capacitor 202 and a resistor 204 filter the rectified AC to obtain a DC level proportional to the amplitude of the oscillator, that is compared to a DC level derived from a resistor 210 and a resistor 212. A comparator 214 and a resistor 216 perform the comparison function and generate an output signal 218 for the inductive proximity sensor 164.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. An electronic system for monitoring a trailer hitch assembly having a hitch plate with a throat for receiving a kingpin of a trailer and a locking mechanism for locking the kingpin in the throat, the electronic system determining whether the trailer hitch assembly is properly coupled to the trailer and comprising:
   a first magnet creating a first magnetic flux;
   a first Hall-effect sensor for sensing the position of a kingpin of a trailer relative to a throat of a hitch plate by measuring the first magnet flux; and
   a control circuit operably coupled with the first Hall-effect sensor and determining whether the first magnetic flux indicates a proper location of a kingpin of a trailer relative to a throat of a hitch plate wherein the control circuit is adapted to adjust a sensitivity of the first Hall-effect sensor to the first magnetic flux.

2. The electronic system of claim 1, wherein the first Hall-effect sensor is aligned with a magnetic axis of the first magnet.

3. The electronic system of claim 1, further including:
a second magnet creating a second magnetic flux measured by the first Hall-effect sensor, wherein the second magnetic flux is primarily effected by a component of a hitch plate.

4. The electronic system of claim 3, wherein the first Hall-effect sensor is aligned with a magnetic axis of the first magnet, and wherein the first Hall-effect sensor is offset from a magnetic axis of the first magnet.

5. The electronic system of claim 1, further including:
a second Hall-effect sensor that measures the first magnetic flux and that is offset from a magnetic axis of the first magnet;
a second magnet creating a second magnetic flux and having a magnetic axis; and
a third Hall-effect sensor that measures the second magnetic flux and that is offset from the magnetic axis of the second magnet.

6. The electronic system of claim 5, wherein the second and third Hall-effect sensors are each located between a throat of a hitch plate and the first and second magnets.

7. The electronic system of claim 1, wherein the first magnet and the first Hall-effect sensor are position across a portion of a throat of a hitch plate from one another.

8. The electron system of claim 1, further including:
a display device operably coupled to the control circuit and displaying coupling status to an operator of a vehicle.

9. A hitching system, comprising:
a trailer hitch assembly having a hitch plate with a throat for receiving a kingpin of a trailer, and a locking mechanism for locking the kingpin in the throat;
a first magnet creating a first magnetic flux;
a first Hall-effect sensor for sensing the position of a kingpin of a trailer relative to the throat of the hitch plate by measuring the first magnet flux; and
a control circuit operably coupled with the first Hall-effect sensor and determining whether the first magnetic flux indicates a proper location of a kingpin of a trailer relative to the throat of the hitch plate wherein the control circuit is adapted to adjust a sensitivity of the first Hall-effect sensor to the first magnetic flux.

10. The hitching system of claim 9, wherein the first Hall-effect sensor is aligned with a magnetic axis of the first magnet.

11. The hitching system of claim 9, further including:
a second magnet creating a second magnetic flux measured by the first Hall-effect sensor, wherein the second magnetic flux is primarily effected a component of the hitch plate.

12. The hitching system of claim 11, wherein the first Hall-effect sensor is aligned with a magnetic axis of the first magnet, and wherein the first Hall-effect sensor is offset from a magnetic axis of the first magnet.

13. The hitching system of claim 9, further including:
a second Hall-effect sensor that measure the first magnetic flux and that is offset from a magnetic axis of the first magnet;
a second magnet creating a second magnetic flux and having a magnetic axis; and
a third Hall-effect sensor that measures the second magnetic flux and that is offset from the magnetic axis of the second magnet.

14. The hitching system of claim 13, wherein the second and third Hall-effect sensors are each located between the throat of the hitch plate and the first and second magnets.

15. The hitching system of claim 9, wherein the first magnet and the first Hall-effect sensor are positioned across a portion of the throat of the hitch plate from one another.

16. The hitching system of claim 9, further including:
a display device operably coupled to the control circuit and displaying coupling status to an operator of a vehicle.

17. An electronic system for monitoring a trailer hitch assembly having a hitch plate with a throat for receiving a kingpin of a trailer and a locking mechanism for locking the kingpin in the throat, the electronic system determining whether the trailer hitch assembly is properly coupled to the trailer and comprising:
a non-contact proximity sensor for sensing the position of a kingpin of a trailer relative to a throat of a hitch plate, wherein the non-contact proximity sensor comprises an inductive sensor, and wherein the inductive sensor oscillates at a frequency of less than or equal to about 50 kHz;
a control circuit operably coupled with the proximity sensor and determining whether a kingpin of a trailer is properly located relative to a throat of a hitch plate; and
a display device operably coupled to the control circuit and displaying coupling status to an operator of a vehicle wherein the non-contact proximity sensor is adjusted for sensitivity for detecting the position of kingpin of trailer relative to the throat of the hitch plate.

18. A hitching system, comprising:
a trailer hitch assembly having a hitch plate with a throat for receiving a kingpin of a trailer, and a locking mechanism for locking the kingpin in the throat;
a non-contact proximity sensor for sensing the position of a kingpin of a trailer relative to the throat of the hitch plate, wherein the non-contact proximity sensor comprises an inductive sensor, and wherein the inductive sensor oscillates at a frequency of less than or equal to about 50 kHz;
a control circuit operably coupled with the proximity sensor and determining whether a kingpin of a trailer is properly located relative to the throat of the hitch plate; and
a display device operably coupled to the control circuit and displaying coupling status to an operator of a vehicle wherein the non-contact proximity sensor is adjusted for sensitivity for detecting the position of kingpin of trailer relative to the throat of the hitch plate.

* * * * *

UNITED STATES PATENT AND TRADEMARK OFFICE
CERTIFICATE OF CORRECTION

PATENT NO.         : 7,548,155 B2                                    Page 1 of 2
APPLICATION NO. : 11/350542
DATED              : June 16, 2009
INVENTOR(S)       : Schutt et al.

It is certified that error appears in the above-identified patent and that said Letters Patent is hereby corrected as shown below:

Title Page of Patent, (74) Attorney, Agent, or Firm:

"Henevald" should be --Heneveld--.

Title Page of Patent, Abstract, line 5;

"hitch assemblies is" should be --hitch assemblies are--.

Column 3:

Line 15, "cross-section side view of a the" should be --cross-sectional side view of the--.
Line 53, "FIG. 13A a schematic" should be --FIG. 13A is a schematic--.
Line 58, "wherein the a kingpin" should be --wherein the kingpin--.

Column 5:

Line 22, "that and audio" should be --that an audio--.
Line 27, "an alternative," should be --an alternative to,--.

Column 7:

Line 60, "inductors" should be --inductor's--.

Column 8:

Line 13, "resistors, 176" should be --resistors 176--.
Line 24, "causes" should be --cause--.

Column 9:

Line 25, "position" should be --positioned--.
Line 27, "electron" should be --electronic--.
Line 38, "first magnet flux" should be --first magnetic flux--.
Line 52, "effected a component" should be --effected by a component--.

Column 10:

Line 2, "that measure the" should be --that measures the--.
Line 6, "; and;" should be --, and;--.
Line 36, "of kingpin of trailer" should be --of the kingpin of the trailer--.
Line 56, "of kingpin of trailer" should be --of the kingpin of the trailer--.

Signed and Sealed this

Twentieth Day of April, 2010

David J. Kappos
*Director of the United States Patent and Trademark Office*